US006621471B1

United States Patent
Ozaki et al.

(10) Patent No.: US 6,621,471 B1
(45) Date of Patent: Sep. 16, 2003

(54) DISPLAY DEVICE HAVING COMBINED DISPLAY-PANEL UNIT

(75) Inventors: Masaaki Ozaki, Kariya (JP); Takahisa Kaneko, Chiryu (JP); Ken Nishioka, Toyoake (JP); Tsuneo Uchida, Okazaki (JP)

(73) Assignee: Denso Corporation, Kariya (JP)

( * ) Notice: Subject to any disclaimer, the term of this patent is extended or adjusted under 35 U.S.C. 154(b) by 123 days.

(21) Appl. No.: 09/658,473

(22) Filed: Sep. 8, 2000

(30) Foreign Application Priority Data

Sep. 16, 1999 (JP) .......................................... 11-262304

(51) Int. Cl.[7] ................................................ G06G 5/00
(52) U.S. Cl. ................... 345/4; 345/5; 345/76; 362/29
(58) Field of Search ................. 345/4, 5, 6, 7, 345/8, 9, 87, 102, 76, 77; 340/815.55, 980; 362/23, 28, 29, 489

(56) References Cited

U.S. PATENT DOCUMENTS

| 5,920,256 A | * | 7/1999 | Toffolo et al. ................. 345/4 |
| 5,989,785 A | | 11/1999 | Ishihara et al. |
| 6,009,355 A | * | 12/1999 | Obradovich et al. ........... 345/7 |
| 6,115,008 A | * | 9/2000 | Palalau et al. ................. 345/7 |
| 6,120,159 A | | 9/2000 | Inoguchi et al. |
| 6,181,301 B1 | * | 1/2001 | Inoguchi et al. ............... 345/5 |
| 6,337,672 B1 | * | 1/2002 | Inoguchi et al. ............... 345/5 |

FOREIGN PATENT DOCUMENTS

| EP | 0775291 | 1/1999 |
| JP | 10-91087 | 4/1998 |

* cited by examiner

*Primary Examiner*—Xiao Wu
(74) *Attorney, Agent, or Firm*—Posz & Bethards, PLC (57) ABSTRACT

A display device is comprised of a main display panel, a transparent display panel that is disposed to cover the first display panel, and a control unit. The main display panel indicates a first information pattern, the transparent display panel indicates a second information pattern, and the control unit controls relative visibility of the main and transparent display panels to selectively indicate the first and second information patterns according to various vehicle conditions.

30 Claims, 9 Drawing Sheets

DISPLAY DEVICE HAVING COMBINED DISPLAY-PANEL UNIT

CROSS REFERENCE TO RELATED APPLICATION

The present application relates to U.S. patent application Ser. No. 08/899,566 filed Jul. 24, 1997 and is based on and claims priority from Japanese Patent Application Hei 11-262304 filed Sep. 16, 1999, the contents of which are incorporated herein by reference.

BACKGROUND OF THE INVENTION

1. Field of the Invention

The present invention relates to a display device having a combined display-panel unit that is comprised of a main display panel and a transparent display panel overlapping the main display panel.

2. Description of the Related Art

JP-A-10-91087, which corresponds to U.S. patent application Ser. No. 09/899,566, and EP 0775 291 B1, which corresponds to JP-A-10-504101, disclose a vehicle combination meter having a front display panel that is comprised of a transparent electro-luminescent (EL) panel and a back display panel. When the back display panel displays an information pattern, the back display panel is illuminated while the front display panel is turned off to make the information patter visible. On the other hand, when the front display panel displays an information pattern, the illumination of the back panel is turned off. That is, the display is changed from one to another by turning on or off the illumination of the panels.

In the above combination meter, either one of the front and back panels can display the information pattern. If the information patterns are displayed by both panels concurrently, it is difficult for a viewer to recognize the information patterns correctly.

SUMMARY OF THE INVENTION

Therefore, a main object of the invention is to provide a display device having an improved combined-display-panel unit.

Another object of the invention is to provide a combined-display-panel unit that includes a main panel and a transparent panel, both of which can display clear information patterns concurrently.

According to a main aspect of the invention, a display device includes a main display panel, a transparent display panel disposed to cover the first display panel, and a control unit controlling relative visibility of the main and transparent displays to have a user selectively recognize information patterns displayed by both the display panels. Therefore, it is possible to indicate various information patterns by using any one of the panels or both panels, as the occasion demands.

According to another aspect of the invention, the control unit of the above display device controls luminance of at least one of the main and transparent display panels. Therefore, a user can easily recognize the level of importance or seriousness of the information. For this purpose, it is possible to increase the luminance of one of the display panel that indicates more important information patterns. It is also possible to increase the luminance for a predetermined period, and to change color or size of the transparent display.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A display device according to a first embodiment of the invention is described with reference to FIGS. 1–11A, B and C.

Figure 1:
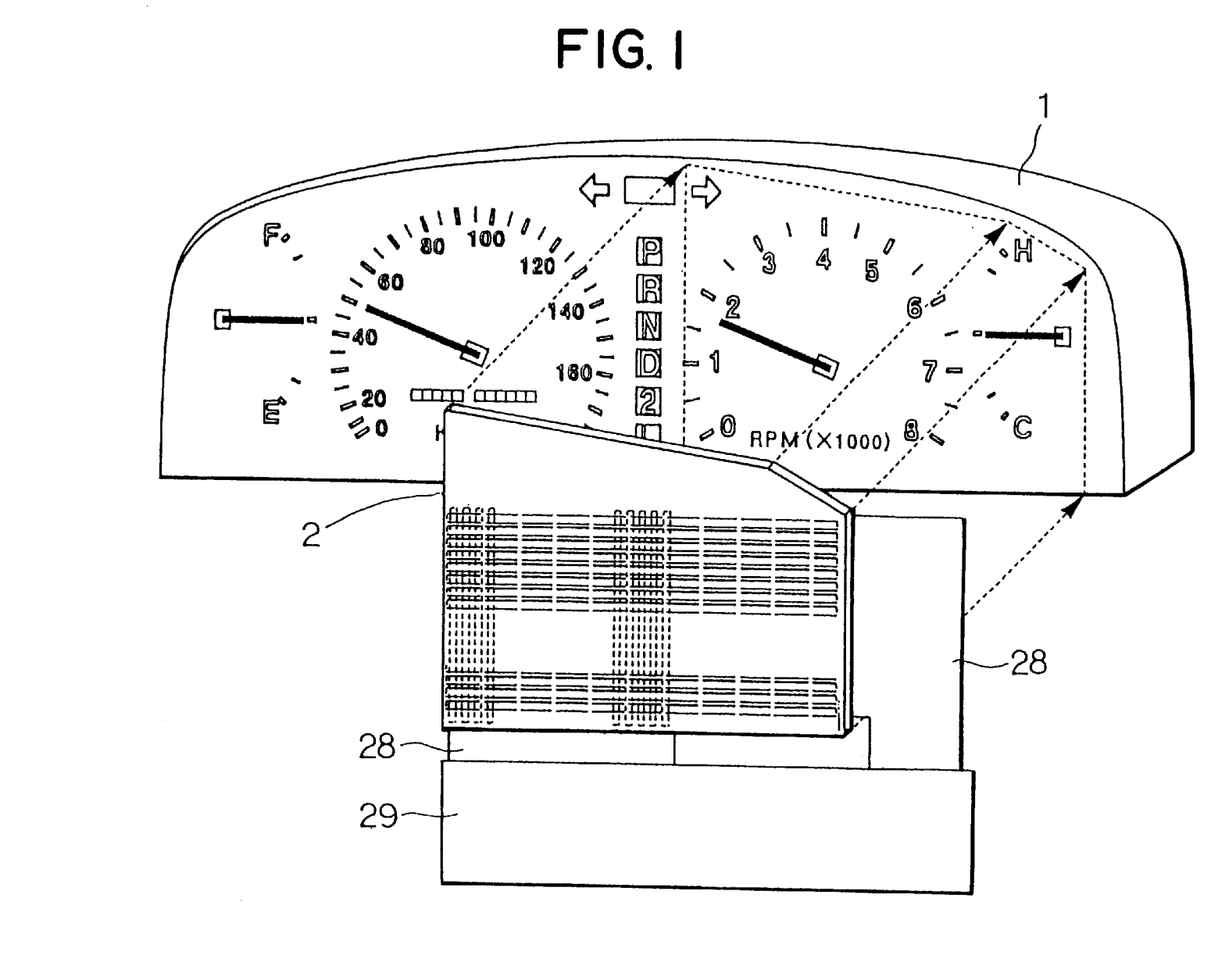
FIG. 1 is an exploded diagram of a display device having a combined-display-panel unit according to a first embodiment of the invention.

Display device 1 is a combination meter that includes a speedometer, tachometer, a fuel gauge, a cooling-water-temperature gauge, and an odometer. Illumination lamps 51, 52, 53 and 54 are disposed behind dial plate 3 to respectively illuminate the cooling-water-temperature gauge, the tachometer, the speedometer, and the fuel gauge. Indicators 41, 42, 43 and 44 of the cooling-water-temperature gauge, the tachometer, the speedometer, and the fuel gauge are respectively disposed at the front side of dial plate 3. Dial plate-3 is made of a transparent resinous plate with opaque scales and letters thereon. Indicators 41, 42, 43 and 44 are made of transparent resinous material. Drive units 61, 62, 63 and 64 respectively drive the indicators in response to signals from respective sensors (not shown).

The speedometer, the tachometer, the fuel gauge, the cooling-water-temperature gauge, and the odometer with dial plate 3, indicators 41, 42, 43 and 44, compose a self-illumination type combination meter. Dial plate 3, indicators 41, 42, 43 and 44 respectively illuminate when illumination lamps 51, 52, 53 and 54 are turned on and darken when the illumination lamps are turned off.

Figure 2:
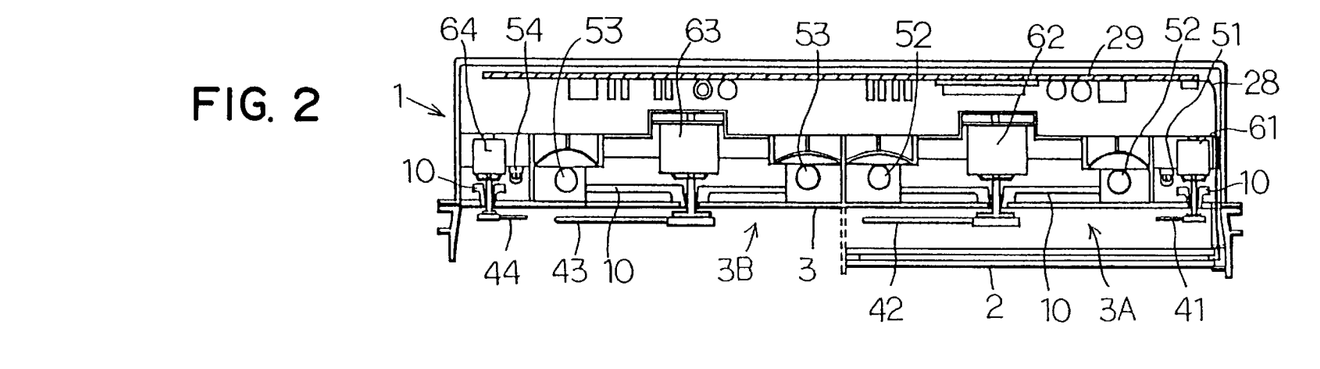
FIG. 2 is a schematic cross-sectional plan view of the display device shown in FIG. 1.

In FIG. 2, illumination lamps 52 and 53 are ring-shaped fluorescent lamps, and lamps 51 and 54 are incandescent lamps. Light conduction members 10 are disposed to respectively correspond to illumination lamps 51, 52, 53 and 54, so that light conduction members 10 can conduct portions of lights emitted from illumination lamps 51, 52, 53 and 54 to indicators 41, 42, 43 and 44. The remainders of the lights emitted from illumination lamps 51, 52, 53 and 54 pass through the transparent portions of dial plate 3.

Figure 5:
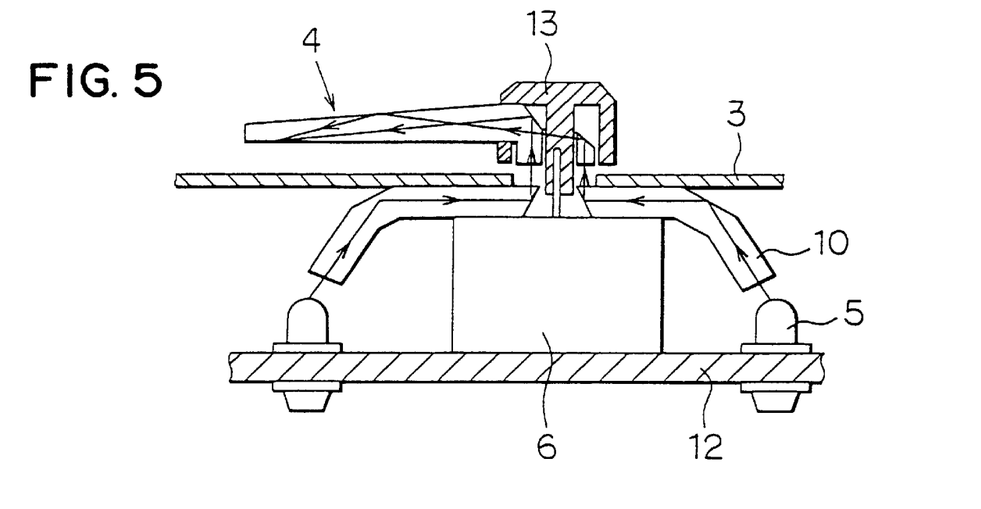
FIG. 5 is a schematic cross-sectional side view of an example of a self-illumination-type meter of the display device.

As shown in FIG. 5, light conduction member 10 conducts the light emitted from lamp 5 to transparent indicator 4 to illuminate the same. Reference numeral 12 is a back panel, and reference numeral. 13 is a cap.

Figure 6:
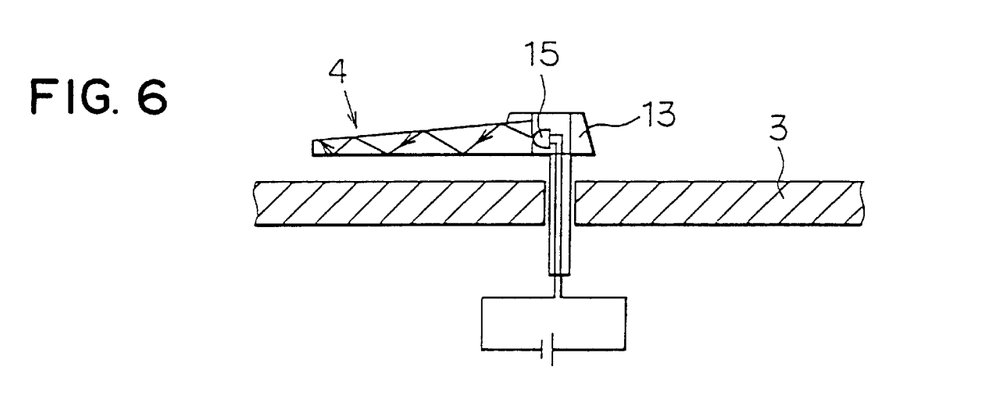
FIG. 6 is a schematic diagram of another example of the self-illumination-type meter of the display device.
Figure 7:
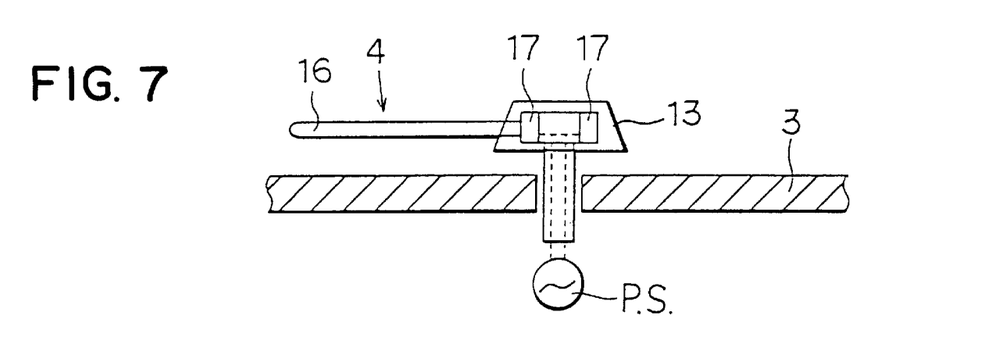
FIG. 7 is a variation of the self-illumination-type meter.

As shown in FIG. 6, it is possible to illuminate indicator 4 by the light emitted from LED 15. As shown in FIG. 7, it is also possible to illuminate indicator 4 by fluorescent lamp 16 that is energized by an outside power source P.S. through a pair of electrodes 17.

Figure 8A:
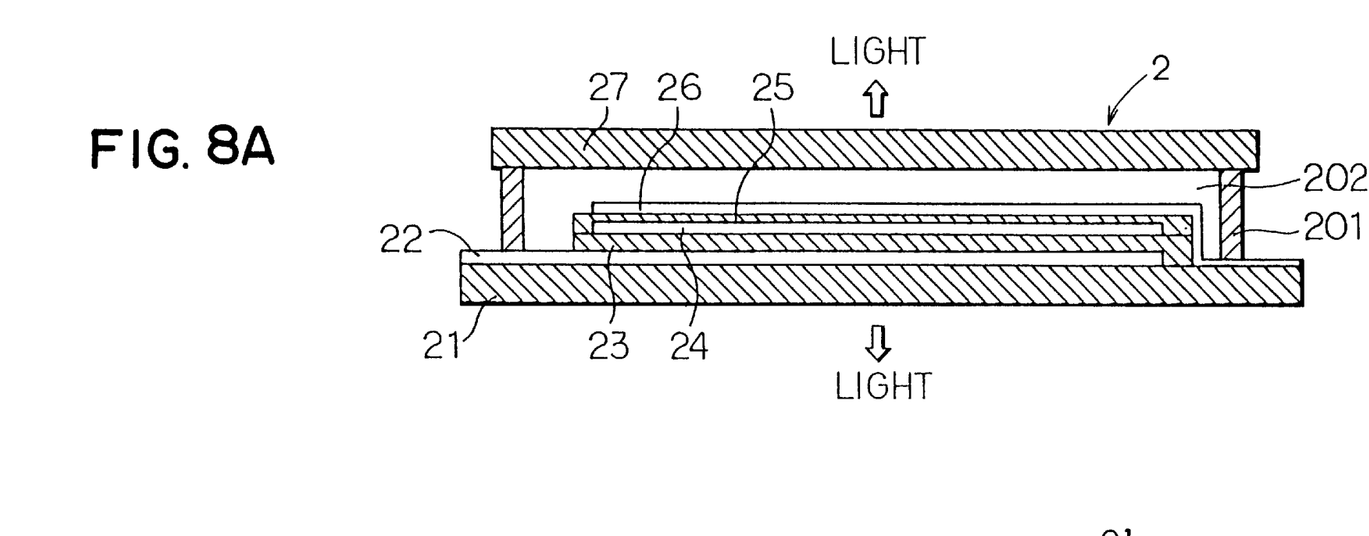
FIG. 8A is a schematic cross-sectional view of a transparent EL display panel of a combined display-panel unit according to the first embodiment of the invention.

As shown in FIG. 8A, transparent EL display panel 2 is comprised of glass substratum 21, an EL portion including elements 22, 23, 24, 25 and 26, spacer 201, and back plate 27. Spacer 201 supports back plate 27 at a distance from glass substratum 21 to provide hermetically sealed space 202, which is filled with silicone oil or the like. First and second transparent EL element 22 and 26 are transparent conductive films made from ITO (indium-tin oxide) or ZnO (zinc oxide). First and second insulation layers 23 and 25 are made from silicon nitride oxide, tantalum oxide and etc. Illumination layer 24 is made from zinc sulfide (as the host material).

Figure 8B:
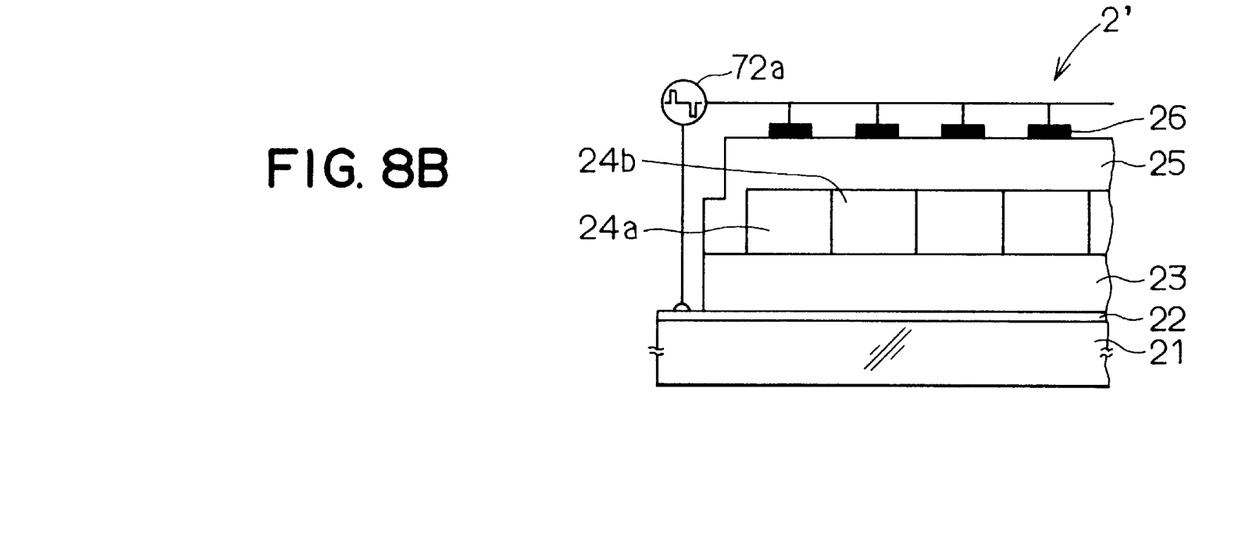
FIG. 8B is a variation thereof.

EL display panel 2 can be a color display panel. As shown in FIG. 8B, color transparent EL display panel 2' can be comprised of glass substratum 21, an EL portion including elements 22, 23, 24a, 24b, 25 and 26. First and second insulation layers 23 and 25 are made from silicon nitride oxide, tantalum oxide and etc. First (orange color) illumination layer 24a and second (green color) illumination layer 24b are disposed side by side on first insulation layer 23. First illumination layer 24a is made from Zns:Mn, and second illumination layer 24b is made from Zns:Tb. First and second transparent EL element 22 and 26 are transparent conductive films made from ITO (indium-tin oxide) or ZnO (zinc oxide). An alternating voltage is applied by drive control circuit 72a across first transparent EL element 22 and second transparent EL element 26 so that first illumination layer 24a and second illumination layer 24b can illuminate in the respective colors. As a result, an ordinal message can be displayed in the green color, and a warning message can be displayed in the orange color. This operation is described in, for example, U.S. Pat. No. 5,989,785.

EL display panel 2 can be comprised of elements made from organic material. EL display panel 2 shown in FIG. 1 is disposed in front of the tachometer of display device 1 with circuit board 29 of a drive and control unit being disposed at the back thereof. El display panel 2 and circuit board 29 are connected to each other by flexible circuit board 28.

Figure 3:
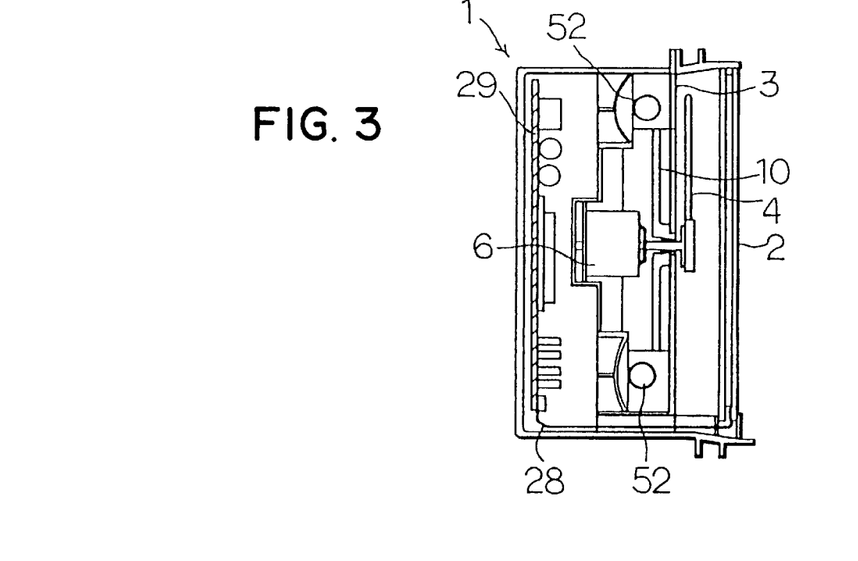
FIG. 3 is a schematic cross-sectional side view of the display device shown in FIG. 1.

Flexible circuit board 28 is soldered to first EL element at the right side of EL display panel 2 and to second EL element at the bottom of the same. As shown in FIGS. 2 and 3, flexible circuit board 28 extends from the right bottom of EL display panel 2 toward the back of display device 1 to be connected to circuit board 29 by a connector.

Figure 4:
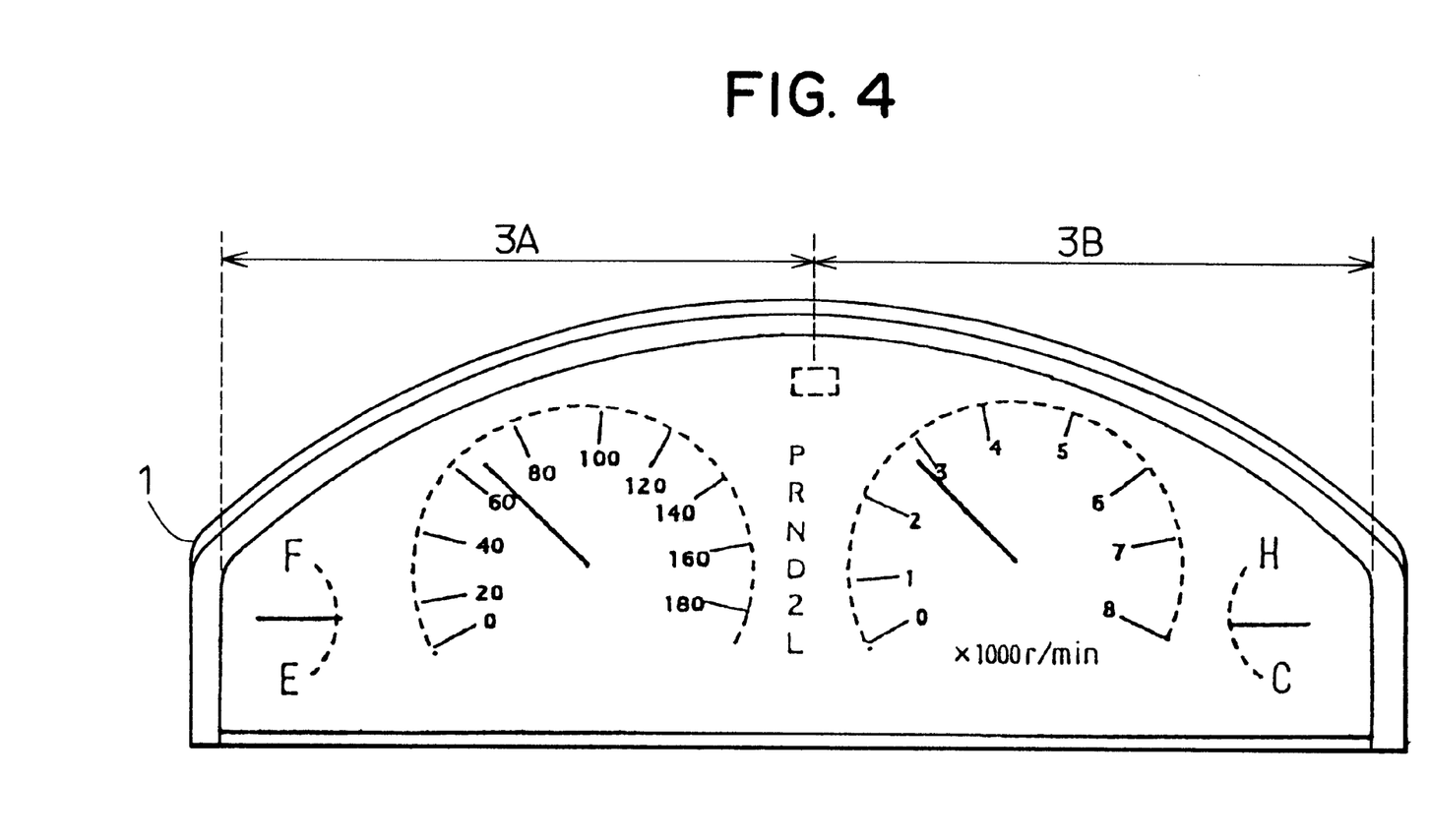
FIG. 4 is a schematic front view of the display device according to the first embodiment.

As shown in FIGS. 1 and 4, transparent EL display panel 2 overlaps or covers approximately a half of the front surface of display device 1 so that the front surface of display device 1 is divided to two sections, 3A and 3B.

Figure 9:
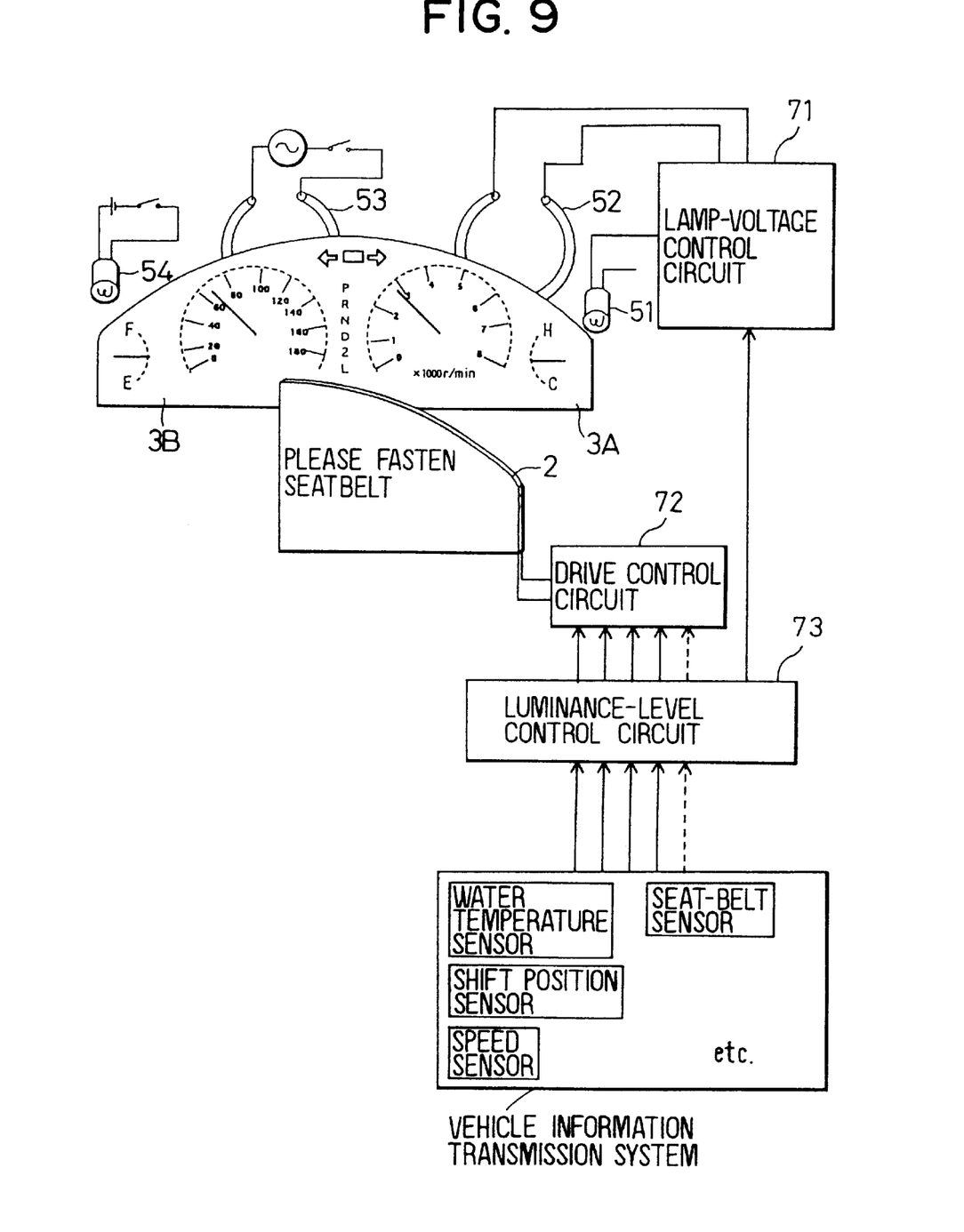
FIG. 9 is a block diagram of a luminance control unit of the display device according to the first embodiment.

As shown in FIG. 9, display device 1 has illumination lamps 51 and 52, lamp-voltage control circuit 71, drive control circuit 72, luminance-level control circuit 73, and vehicle information transmission system 74. Luminance-level control circuit 73 controls lamp-voltage control circuit 7i and drive control circuit 72. Lamp-voltage control circuit 71 controls the luminance level of Illumination lamps 51 and 52. Drive control circuit 72 controls voltage applied to illumination layer 24, thereby controlling the luminance level of EL display panel 2. Drive control circuit 72 includes a flash control circuit for flashing a message during a preset period. Luminance-level control circuit 73 receives signals and data from various sensors, such as a cooling-water temperature sensor, a seat-belt sensor, a gear-shift-position sensor, and a vehicle speed sensor. Luminance-level control circuit 73 determines the luminance levels of lamps 51 and 52 and EL display panel 2 according to the signals and data of vehicle information transmission system 74. Luminance-level control circuit 73 sends lamp-voltage control circuit 71 and drive control circuit 72 to restore the luminance level to the original level after a preset time passes.

If a driver starts an engine of a vehicle equipped with the above described device without fastening a seat belt, luminance-level control circuit 73 receives an unfasten signal of a seat-belt sensor. Luminance-level control circuit 73 sends a control signal to lamp-voltage control circuit 71 and another unfasten control signal to drive control circuit 72. Lamp-voltage control circuit 71 lowers the lamp voltage, thereby lowering the luminance levels of lamps 51 and 52. Drive control circuit 72 controls transparent EL display panel 2 to flash a message "Please fasten seat belt" thereon, several times at a high luminance level, so that the message overlaps the display of the tachometer.

In the meanwhile, a normal person can clearly recognizes a signal if the ratio between a lower level luminance and a higher level luminance is 1.2 or more, and $\sqrt{2}$ at optimum.

Therefore, the ratio between the lower luminance display by the tachometer and the higher luminance display of EL display panel is set to $\sqrt{2}$, so that a driver can best recognize the message in a short time.

Figure 10:
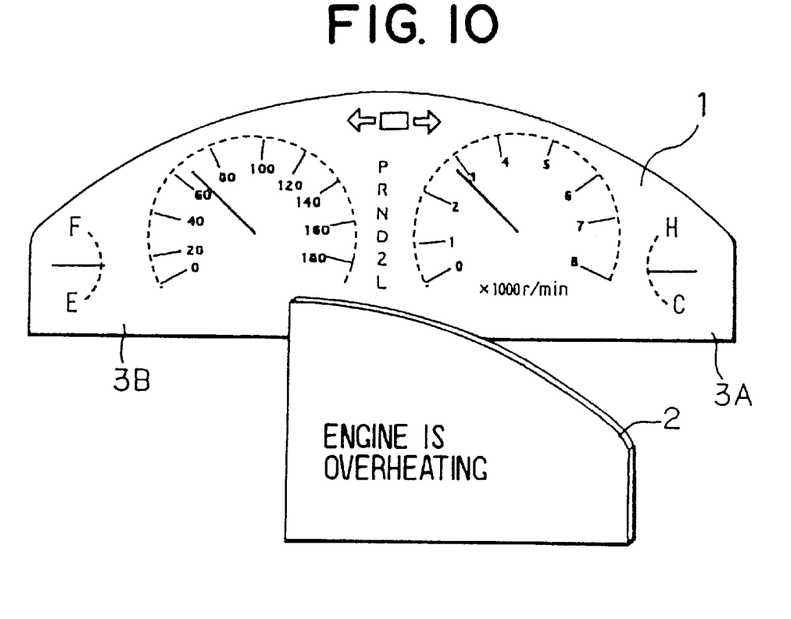
FIG. 10 is an example of an information pattern displayed by the combined-display-panel unit according to the first embodiment.

FIG. 10 shows an example of a warning message "Engine is overheating" on EL display panel 2. This warning message is provided by substantially the same luminance control unit as that shown in FIG. 9 when the cooling-water-temperature sensor detects a temperature that is higher than a maximum level of the normal cooling-water temperature. Luminance-level control circuit 73 sends voltage control circuit 71 a control signal to lower the luminance level of the lamps and drive control circuit 72 a control signal indicating that the cooling-water temperature is higher than a maximum level of the normal cooling-water temperature. Voltage control circuit 71 lowers the luminance level of lamps 51 and 52, and drive control circuit 72 controls transparent EL display panel to display message "Engine is overheating" at a luminance level higher than the luminance level of the tachometer or the cooling-water-temperature gauge. The ratio between the lower level luminance and the higher level luminance is $\sqrt{2}$. The display of the message also overlaps the display of the tachometer. It is also possible to flash the message display.

Thus, when transparent EL display panel 2 displays a warning message related to the seat belt or engine overheating, the luminance level thereof is made higher than the luminance level of the tachometer and cooling-water-temperature gauge. Therefore, a driver can recognize the warning message very clearly.

It is possible to change the luminance level of EL display panel 2 according to the content of the information while the luminance levels of the tachometer and the cooling-water temperature-gauge are fixed. This can omit circuits for controlling the luminance levels of the tachometer and the cooling-water-temperature gauge.

Figure 11A:
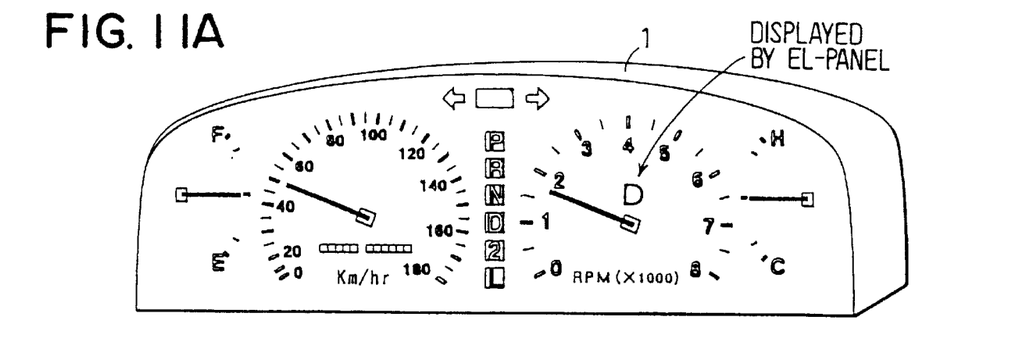
FIGS. 11A, 11B and 11C illustrate examples of information patterns displayed by the combined-display-panel unit of a display device according to variations of the first embodiment.

Variations of the display device having a combined-display-panel unit according to the first embodiment of the invention is described with reference to FIGS. 11A, 11B and 11C. Each one of the variations is provided with substantially the same luminance control unit as that shown in FIG. 9. However, the flash control circuit can be removed according to circumstances. As shown in FIG. 11A, EL display panel 2 displays letter "D" at the same luminance level as the tachometer and the cooling-water-temperature gauge. The letter "D" indicates that the shift lever is positioned at the drive range "D". A driver can also see the tachometer and the cooling-water-temperature gauge through transparent EL display panel 2.

When the shift lever is changed, a signal indicating the change of the shift lever is sent to luminance-level control circuit 73. Consequently, luminance-level control circuit 73 sends voltage control circuit 71 a control signal to lower the luminance level and drive control circuit 72 to increase the luminance level thereof. Voltage control circuit 71 lowers the luminance level of lamps 51 and 52, and drive control circuit 72 increases the luminance level of the transparent EL display panel 2 to a level higher than the luminance levels of the tachometer and the cooling-water-gauge. The above operation lasts several seconds after the shift lever changes.

Thus, the luminance level of EL display panel 2 is made higher than the luminance levels of a main display panel, such as a portion of dial plate 3 corresponding to the tachometer or the cooling-water-temperature gauge, if displayed information is important or changing. The luminance level of EL display panel 2 can be made equal to that of the main display panel if displayed information is not so important or is not changing.

Figure 11B:
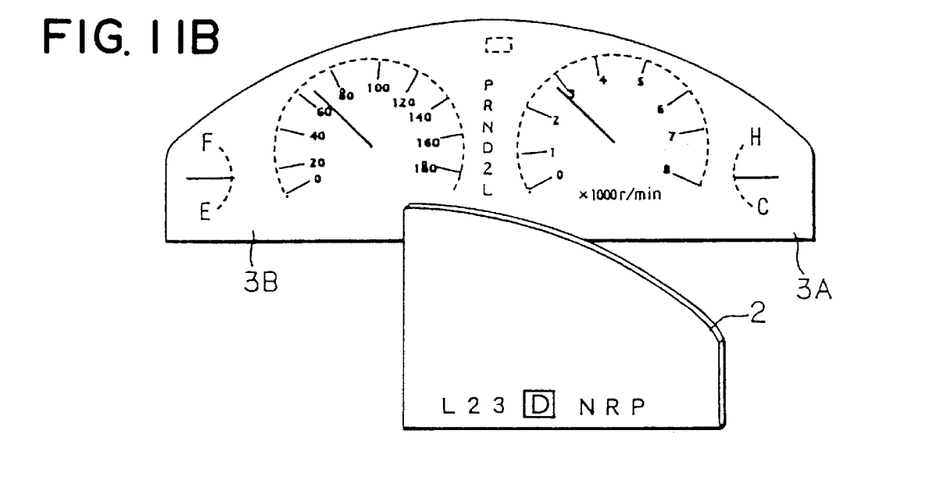

FIG. 11B illustrates another variation of display by EL display panel 2. A plurality of letters L, 2, 3, D, N, R, P that correspond to positions of the shift lever is displayed at lower portion of EL display panel 2. A driver can also see the tachometer and the cooling-water-temperature gauge through transparent EL display panel 2.

In this arrangement, the displays of the main panel 1 and EL display panel 2 do not overlap each other, so that the luminance levels thereof can be made equal to each other.

Figure 11C:
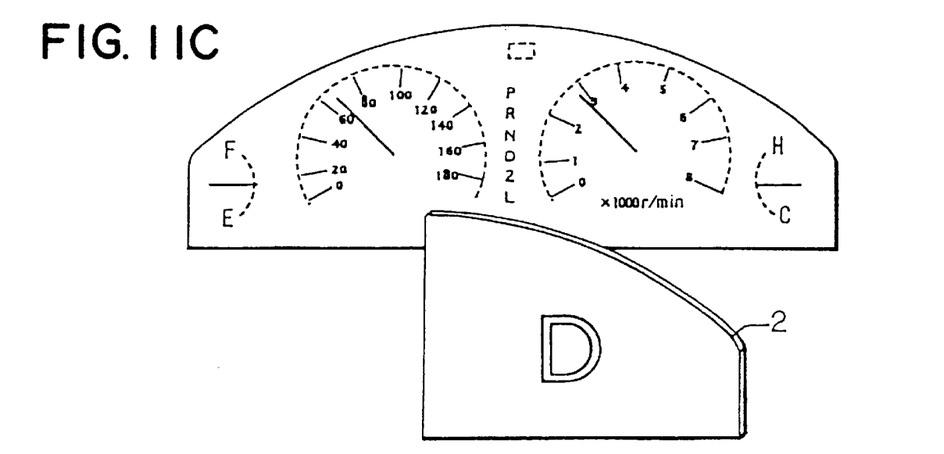

FIG. 11C illustrates another variation of the display by EL display panel 2. Enlarged letter D that corresponds to the D-range of the shift lever is displayed at the center of EL display panel 2 only when the shift lever is being changed to the D-range.

Figure 12:
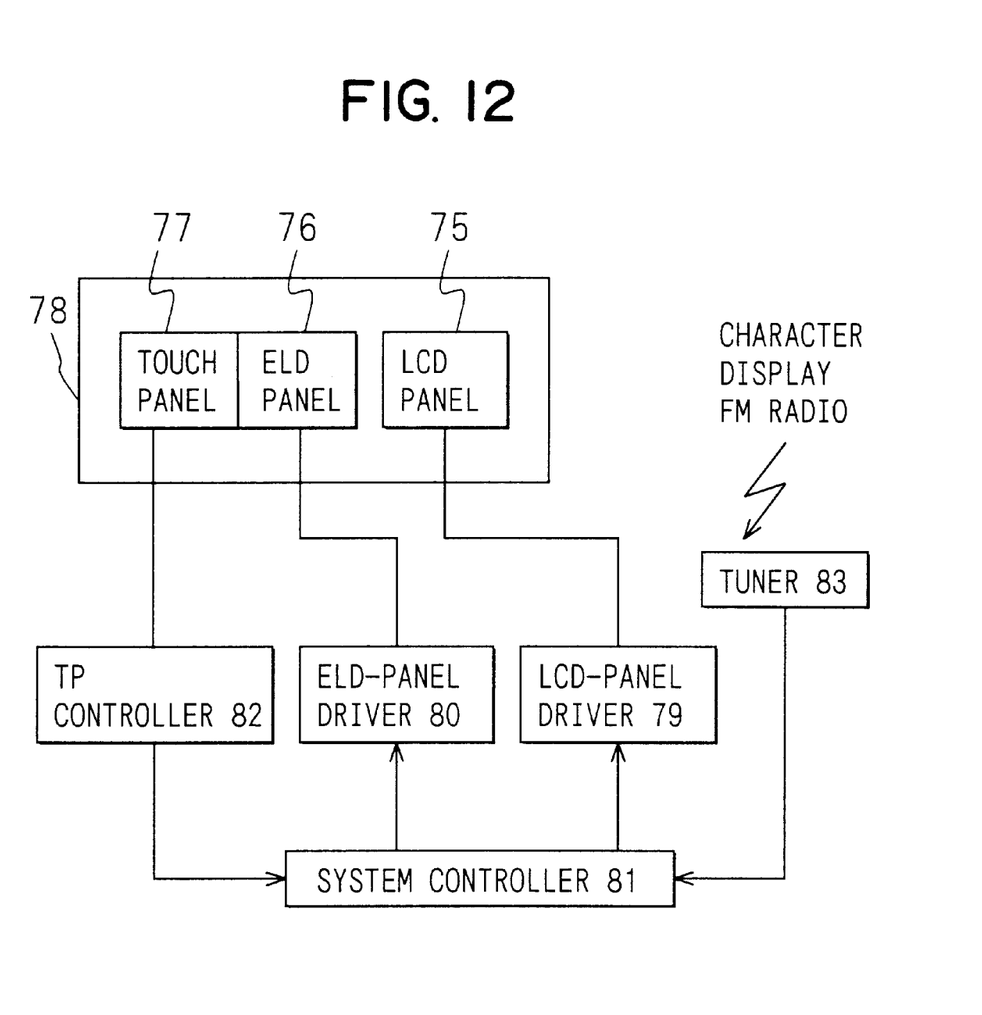
FIG. 12 is a block diagram of a display device having a combined-display-panel unit according to a second embodiment of the invention.

A display device having a combined-display-panel unit according to a second embodiment of the invention is described with reference to FIGS. 12 and 13.

The display device is comprised of combined panel unit 78, LCD-panel drive-circuit 79, EL-display-panel drive-circuit 80, touch-panel control circuit 82, system control circuit 81, and radio-wave tuner 83. Panel unit 78 includes liquid crystal display (LCD) panel 75, transparent EL display panel 76, and touch panel 77, which are respectively connected to LCD-panel drive-circuit 79, EL-display-panel drive circuit 80, and touch-panel control circuit 82. LCD-panel drive-circuit 79, EL-display-panel drive circuit 80, and touch-panel control circuit 82 are also connected to system control circuit 81. Radio-wave tuner 83 is also connected to system control circuit. A driver can obtain various kinds of information such as character messages from outside radio stations by tuner 83 and system control circuit 81.

EL display panel 76 is disposed in front of LCD panel 75, and touch panel 77 is disposed close to the front surface of EL display panel 76. If a driver touches a portion of touch panel 77, a signal corresponding to the portion is sent from touch panel control circuit 82 to system control circuit 81.

Figure 13:
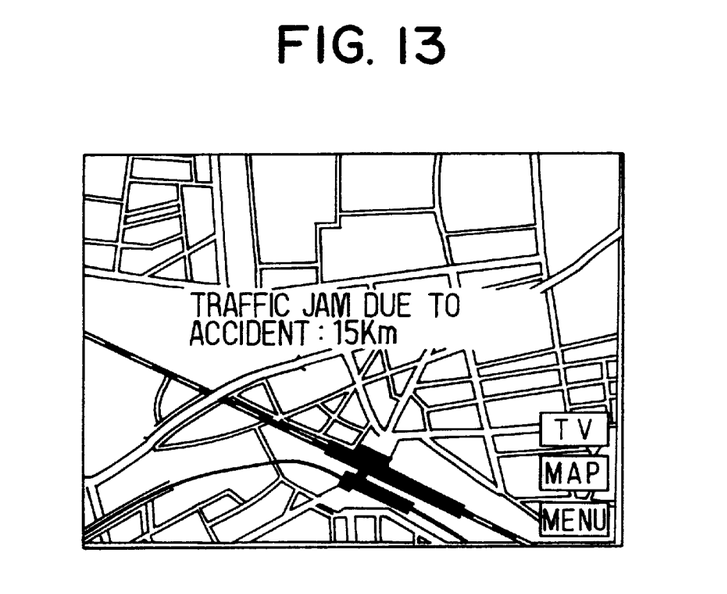
FIG. 13 illustrates an example of the display pattern displayed by the combined panel unit according to the second embodiment of the invention.

As shown in FIG. 13, LCD panel 75 displays a map, and transparent EL display panel 76 displays messages, menus, and switches of TV set and others. If a user touches a portion of touch panel 77 overlapping one of the switches displayed on transparent EL display panel 76, a signal corresponding to the touched portion is sent from touch panel control circuit 82 to system control circuit 81. System control circuit 81 sends control signals corresponding to the touched portion to LCD-panel drive-circuit 79 and EL-display panel drive-circuit 80. For example, if the user touches a portion corresponding to a switch of a TV set, the display of LCD panel 75 changes to a TV program from something like a map. The display of switches on EL display panel 76 can be changed according to the display pattern of LCD panel 75.

Usually, the luminance level of displays of menus, maps, TV programs by EL display panel 76 is set lower than the luminance level of the display by LCD panel 75, so that a user can recognize a map on LCD panel 75 easily. When the user touches a specific portion of touch panel 77 corresponding to a switch that is displayed by EL display panel 76, the luminance level of the touched portion increases to a level higher than the luminance level of LCD panel 75. Therefore, the user can recognize the touched portion very easily.

It is possible to provide a switch-that is not usually displayed by EL display panel 76 but is only displayed when a finger of the user is detected its access to the switch by means of an infrared light sensor or the like. It is also possible for EL display panel 76 to display broadcasted character messages. For example, if system control circuit 81 receives a broadcasted message "TRAFFIC JAM DUE TO ACCIDENT: 15 KM", it sends a control signal to LCD-panel drive-circuit 79 to lower the luminance level of LCD panel 75 and a control signal to EL-display-panel drive-circuit 80 to make EL display panel 76 display the same message at a luminance level higher than that of LCD panel 75. As shown in FIG. 13, a portion of a map can be omitted to make the message clearer.

As a variation of the above embodiments, a plurality of transparent EL displays can be provided with a display device. It is also possible to provide a single EL display panel that overlaps a plurality of display panels.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention is to be regarded in an illustrative, rather than restrictive, sense.

What is claimed is:

1. A display device comprising:
   a main display panel indicating a first information pattern at a first visibility condition;

a transparent display panel, disposed to cover at least a portion of said main display panel, for indicating a second information pattern that indicates an independent and separate information from said first information pattern at a second visibility condition so that said second information pattern can overlap said first information pattern; and a control unit for selectively controlling at least one of said first and second visibility conditions to change relative visibility of said main and transparent displays so as to make one of said first and second information patterns stand out from the other.

2. The display device-as claimed in claim 1, wherein said control unit controls luminance of at least one of said main and transparent display panels.

3. The display device as claimed in claim 2, wherein said control unit increases the luminance of one of said main display panel and said transparent display panel that indicates more necessary information for a user to recognize than the other.

4. The display device as claimed in claim 3, wherein said control unit increases the luminance for a predetermined period.

5. The display as claimed in claim 1, wherein said control unit changes color of said transparent display panel to increase visibility of said transparent display panel.

6. The display as claimed in claim 1, wherein said control unit changes said second information pattern in size when the same is indicated.

7. The display device as claimed in claim 1, further comprising a dial plate, a pointer and an illumination element.

8. The display device as claimed in claim 1, further comprising a liquid crystal display panel having a back light.

9. The display device as claimed in claim 1, wherein said transparent display panel comprises a transparent electro-luminescent panel.

10. A display device comprising:

a main display panel indicating a first information pattern at a first visibility condition;

a transparent display panel, disposed to cover at least a portion of said main display panel, for indicating a second information pattern at a second visibility condition so that said second information pattern can overlap said first information pattern; and a control unit for selectively controlling at least one of said first and second visibility conditions to change relative visibility of said main and transparent display panels so as to enable a user to simultaneously recognize said first and second information patterns, wherein said control unit cyclically changes the luminance of one of said display panels whose information pattern is more necessary to have a user to recognize than the other.

11. The display device as claimed in claim 10, wherein said control unit cyclically changes the luminance of said transparent display panel from a maximum luminance to a minimum luminance, and said maximum luminance is the same as the luminance of said main display panel.

12. A display device comprising:

a main display panel indicating a first information pattern at a first visibility condition;

a transparent display panel, disposed to cover at least a portion of said main display panel, for indicating a second information pattern at a second visibility condition so that said second information pattern can overlap said first information pattern; and a control unit for selectively controlling at least one of said first and second visibility conditions to change relative visibility of said main and transparent display panels so as to enable a user to simultaneously recognize said first and second information patterns, wherein said control unit comprises a flash control circuit for flashing said second information pattern during a preset period.

13. The display device as claimed in claim 12, wherein said control unit is further for equalizing luminance levels of said first and second information patterns.

14. A display device comprising:

a main display panel indicating a first information pattern that is illuminated under a first visibility condition;

a transparent display panel, disposed to cover said first display panel, for indicating a second information pattern including information independent and separate information from said first information pattern and that is illuminated under a second visibility condition in addition to said first information pattern; and a control unit for controlling at least one of said first and second visibility conditions to change relative visibility of said main and transparent display panels so as to have a user selectively recognize said first and second information patterns at the same time.

15. A display device comprising:

a main display panel indicating a first information pattern that is illuminated under a first visibility condition;

a transparent display panel, disposed to cover said first display panel, for indicating a second information pattern that is illuminated under a second visibility condition in addition to said first information pattern; and a control unit for controlling at least one of said first and second visibility conditions so as to have a user selectively recognize said first and second information patterns at the same time, wherein said control unit comprises a flash control circuit for flashing said second information pattern during a preset period.

16. The display device as claimed in claim 15, wherein said control unit makes luminance levels of said first and second information patterns equal.

17. A display device comprising:

a main display panel for indicating a first information pattern at a first visibility condition;

a transparent display panel, disposed to cover at least a portion of said main display panel, for indicating a second information pattern including information independent and separate from said first information pattern at a second visibility condition so that said second information pattern can overlap at least a portion of said first information pattern; and a control unit for selectively controlling at least one of said first and second visibility conditions to change relative visibility of said main and transparent displays so as to therefore provide a simultaneous and visually distinguishable display of said first and second information patterns.

18. A display device for use with a plurality of sensors for providing signals indicating conditions of a vehicle, said display device comprising:

a main display panel for indicating a first information pattern at a first visibility condition;

a transparent display panel, disposed to cover at least a portion of said main display panel, for indicating a second information pattern including information independent and separate from said first information pattern at a second visibility condition so that said second information pattern can overlap at least a portion of said first information pattern; and a control unit for selectively controlling at least one of said first and second visibility conditions to change relative visibility of said main and transparent display panels according to one of said signals during a preset period so as to provide a simultaneous and visually distinguishable display of said first and second information patterns.

19. The display device as claimed in claim 18, wherein said control unit controls luminance of at least one of said main and transparent display panels.

20. The display device as claimed in claim 19, wherein said control unit increases the luminance of one of said display panel that indicates more necessary information for a user to recognize than the other.

21. The display device as claimed in claim 20, wherein said control unit increases the luminance for a predetermined period.

22. The display device as claimed in claim 18, wherein said control unit cyclically changes luminance of one of said transparent and main display panels whose information pattern is more necessary to have a user to recognize than the other.

23. The display device as claimed in claim 22, wherein said control unit cyclically changes the luminance of said transparent display panel from a maximum luminance to a minimum luminance, and said maximum luminance is the same as the luminance of said main display panel.

24. The display as claimed in claim 18, wherein said control unit changes color of said transparent display panel to increase visibility of said transparent display panel.

25. The display as claimed in claim 18, wherein said control unit changes said second information pattern in size when the same is indicated.

26. The display device as claimed in claim 18, further comprising a dial plate, a pointer and an illumination element.

27. The display device as claimed in claim 18, further comprising a liquid crystal display panel having a back light.

28. The display device as claimed in claim 18, wherein said transparent display panel comprises a transparent electro-luminescent panel.

29. The display device as claimed in claim 18, wherein said control unit comprises a flash control circuit for flashing said second information pattern during a preset period.

30. The display device as claimed in claim 29, wherein said control unit equalizes luminance levels of said first and second information patterns.

* * * * *